US012446813B2

(12) United States Patent
Fallows et al.

(10) Patent No.: US 12,446,813 B2
(45) Date of Patent: Oct. 21, 2025

(54) AUTOMATED URINE OUTPUT SYSTEM FOR ATTACHMENT TO HOSPITAL BED

(71) Applicant: C. R. Bard, Inc., Franklin Lakes, NJ (US)

(72) Inventors: Eric A. Fallows, Apex, NC (US); Jill Walthall Jones, Avondale Estates, GA (US); Abigail A. Wilms, Tucker, GA (US); Kuilin Lai, Watkinsville, GA (US)

(73) Assignee: C. R. Bard, Inc., Franklin Lakes, NJ (US)

( * ) Notice: Subject to any disclaimer, the term of this patent is extended or adjusted under 35 U.S.C. 154(b) by 450 days.

(21) Appl. No.: 17/893,435

(22) Filed: Aug. 23, 2022

(65) Prior Publication Data

US 2023/0058553 A1 Feb. 23, 2023

Related U.S. Application Data

(60) Provisional application No. 63/236,081, filed on Aug. 23, 2021.

(51) Int. Cl.

| | |
|---|---|
| ***A61B 5/20*** | (2006.01) |
| ***A61B 5/00*** | (2006.01) |
| ***A61F 5/44*** | (2006.01) |

(52) U.S. Cl.

CPC ................ *A61B 5/208* (2013.01); *A61F 5/44* (2013.01); *A61B 5/6852* (2013.01)

(58) Field of Classification Search

CPC .................. A61B 5/208; A61B 5/6852; A61B 2562/0252; A61B 5/20; A61F 5/44;

(Continued)

(56) References Cited

U.S. PATENT DOCUMENTS

| | | | |
|---|---|---|---|
| 3,661,143 | A | 5/1972 | Henkin |
| 3,781,920 | A | 1/1974 | Browne et al. |

(Continued)

FOREIGN PATENT DOCUMENTS

| | | | |
|---|---|---|---|
| CA | 2882654 | A1 | 10/2007 |
| CN | 2445749 | Y | 9/2001 |

(Continued)

OTHER PUBLICATIONS

DFree Personal—Consumer Product Brochure, 2019.

(Continued)

*Primary Examiner* — Rebecca E Eisenberg
*Assistant Examiner* — Alessandro R Del Priore
(74) *Attorney, Agent, or Firm* — Rutan & Tucker LLP

(57) ABSTRACT

Disclosed herein is a system for monitoring urine output (UO) of a patient. The system includes a UO module configured to couple with a collection container. The UO module includes (i) a frame configured for anchoring to frame rails of a bed, (ii) a load cell configured to measure a weight of UO within the container and (iii) logic stored in memory that determines volumetric UO data from the load cell and transmits the UO data across a network to an external entity. An intermediate coupling device between the collection container and the UO module is configured to couple with the collection container and inhibit decoupling from the collection container. The intermediate coupling device includes an identification device attached thereto, identification device including patient information, and the logic links the UO data to the patient information.

23 Claims, 4 Drawing Sheets

115 113 205B 228 105 205A 100 232 112 223A 101 211 210A 221 220 22A 231 110 225 22B 210B 260,260A 223B 234 116 224

(58) Field of Classification Search
CPC ............ A61M 1/71; A61M 2205/3393; A61M 5/1415; G01G 17/04; G01G 21/23; G01G 19/14; G01G 21/28; G01F 15/01; F16M 11/041
See application file for complete search history.

(56) References Cited

U.S. PATENT DOCUMENTS 3,851,650 A 12/1974 Darling
3,919,455 A 11/1975 Sigdell et al.
4,276,889 A 7/1981 Kuntz et al.
4,286,590 A 9/1981 Murase
4,291,692 A 9/1981 Bowman et al.
4,296,749 A 10/1981 Pontifex
4,305,405 A 12/1981 Meisch
4,312,352 A 1/1982 Meisch et al.
4,343,316 A 8/1982 Jespersen
4,443,219 A 4/1984 Meisch et al.
4,448,207 A 5/1984 Parrish
4,509,366 A 4/1985 Matsushita et al.
4,532,936 A 8/1985 LeVeen et al.
4,658,834 A 4/1987 Blankenship et al.
4,712,567 A 12/1987 Gille et al.
4,723,950 A 2/1988 Lee
4,834,706 A 5/1989 Beck et al.
4,850,375 A 7/1989 Rosenberg
4,889,532 A 12/1989 Metz et al.
5,002,541 A 3/1991 Conkling et al.
5,146,637 A 9/1992 Bressler et al.
5,409,014 A 4/1995 Napoli et al.
5,586,085 A 12/1996 Lichte
5,725,515 A 3/1998 Propp
5,733,319 A 3/1998 Neilson et al.
5,738,656 A 4/1998 Wagner
5,747,824 A 5/1998 Jung et al.
5,769,087 A 6/1998 Westphal et al.
5,807,278 A 9/1998 McRae
5,823,972 A 10/1998 McRae
5,891,051 A 4/1999 Han et al.
5,911,786 A 6/1999 Nielsen et al.
6,129,684 A 10/2000 Sippel et al.
6,132,407 A 10/2000 Genese et al.
6,250,152 B1 6/2001 Klein et al.
6,256,532 B1 7/2001 Cha
6,261,254 B1 7/2001 Baron et al.
6,434,418 B1 8/2002 Neal et al.
6,579,247 B1 6/2003 Abramovitch et al.
6,592,612 B1 7/2003 Samson et al.
6,709,420 B1 3/2004 Lincoln et al.
6,716,200 B2 4/2004 Bracken et al.
7,011,634 B2 3/2006 Paasch et al.
7,161,484 B2 1/2007 Tsoukalis
7,211,037 B2 5/2007 Briggs et al.
7,437,945 B1 10/2008 Feller
7,442,754 B2 10/2008 Tepper et al.
7,739,907 B2 6/2010 Boiarski
7,871,385 B2 1/2011 Levinson
7,931,630 B2 4/2011 Nishtala et al.
7,976,533 B2 7/2011 Larsson
7,998,126 B1 8/2011 Fernandez
8,295,933 B2 10/2012 Gerber et al.
8,328,733 B2 12/2012 Forte et al.
8,328,734 B2 12/2012 Salvadori et al.
8,337,476 B2 12/2012 Greenwald et al.
8,374,688 B2 2/2013 Libbus et al.
8,403,884 B2 3/2013 Nishtala
8,471,231 B2 6/2013 Paz
8,663,128 B2 3/2014 Paz et al.
8,773,259 B2 7/2014 Judy et al.
8,790,277 B2 7/2014 Elliott et al.
8,790,320 B2 7/2014 Christensen
8,790,577 B2 7/2014 Mizumoto et al.
8,813,551 B2 8/2014 Boiarski
8,827,924 B2 9/2014 Paz et al.
8,832,558 B2 9/2014 Cardarelli et al.
8,900,196 B2 12/2014 Andino
9,045,887 B2 6/2015 O'Malley
9,050,046 B2 6/2015 Elliott et al.
9,074,920 B2 7/2015 Mendels et al.
9,216,242 B2 12/2015 Nishtala et al.
9,480,821 B2 11/2016 Ciccone et al.
9,592,034 B2 3/2017 Hall et al.
9,642,987 B2 5/2017 Bierman et al.
9,731,097 B2 8/2017 Andino et al.
9,895,095 B2 2/2018 Chen
9,962,516 B2 5/2018 Lampotang et al.
10,071,202 B2 9/2018 Handler
10,182,747 B2 1/2019 Charlez et al.
10,245,008 B2 4/2019 Paige
10,301,807 B1 5/2019 Kolesar
10,362,981 B2 7/2019 Paz et al.
10,383,606 B1 8/2019 McCord et al.
10,448,875 B2 10/2019 Holt et al.
10,799,386 B1 10/2020 Harrison, Sr.
10,881,778 B2 1/2021 Scarpaci et al.
11,540,760 B1 1/2023 Guillemette
11,703,365 B2 7/2023 Tourchak et al.
12,109,353 B2 10/2024 Cheng et al.
2001/0056226 A1 12/2001 Zodnik et al.
2002/0016719 A1 2/2002 Nemeth et al.
2002/0161314 A1 10/2002 Sarajarvi
2002/0193760 A1 12/2002 Thompson
2003/0000303 A1 1/2003 Livingston et al.
2003/0163183 A1 8/2003 Carson
2003/0163287 A1 8/2003 Vock et al.
2004/0267086 A1 12/2004 Anstadt et al.
2005/0020958 A1 1/2005 Paolini et al.
2005/0065583 A1 3/2005 Voorhees et al.
2005/0172712 A1 8/2005 Nyce
2005/0247121 A1 11/2005 Pelster
2006/0065713 A1* 3/2006 Kingery ................. G16H 20/13 235/380
2006/0100743 A1 5/2006 Townsend et al.
2006/0253091 A1 11/2006 Vernon
2007/0010797 A1 1/2007 Nishtala et al.
2007/0078444 A1 4/2007 Larsson
2007/0106177 A1 5/2007 Hama
2007/0145137 A1 6/2007 Mrowiec
2007/0225668 A1 9/2007 Otto
2007/0252714 A1 11/2007 Rondoni et al.
2008/0027409 A1 1/2008 Rudko et al.
2008/0217391 A1 9/2008 Roof et al.
2008/0312550 A1 12/2008 Nishtala et al.
2008/0312556 A1 12/2008 Dijkman
2009/0056020 A1 3/2009 Caminade et al.
2009/0099629 A1 4/2009 Carson et al.
2009/0157430 A1 6/2009 Rule et al.
2009/0287170 A1 11/2009 Otto
2009/0315684 A1 12/2009 Sacco et al.
2010/0064426 A1 3/2010 Chikara Imamura
2010/0094204 A1 4/2010 Nishtala
2010/0130949 A1 5/2010 Garcia
2010/0137743 A1 6/2010 Nishtala et al.
2011/0113540 A1 5/2011 Plate et al.
2011/0120219 A1 5/2011 Barlesi et al.
2011/0178425 A1 7/2011 Nishtala et al.
2011/0224636 A1 9/2011 Keisic
2011/0230824 A1 9/2011 Salinas et al.
2011/0238042 A1 9/2011 Davis et al.
2011/0251572 A1 10/2011 Nishtala et al.
2011/0263952 A1 10/2011 Bergman et al.
2012/0029408 A1 2/2012 Beaudin
2012/0035496 A1 2/2012 Denison et al.
2012/0059286 A1 3/2012 Hastings et al.
2012/0078137 A1 3/2012 Mendels et al.
2012/0078235 A1 3/2012 Martin et al.
2012/0095304 A1 4/2012 Biondi
2012/0109008 A1 5/2012 Charlez et al.
2012/0118650 A1* 5/2012 Gill ....................... G01G 17/04 177/245
2012/0123233 A1 5/2012 Cohen
2012/0127103 A1 5/2012 Qualey et al.
2012/0226196 A1 9/2012 DiMino et al.
2012/0234434 A1 9/2012 Woodruff et al.

(56) References Cited

U.S. PATENT DOCUMENTS

2012/0302917 A1 11/2012 Fitzgerald et al.
2012/0323144 A1 12/2012 Coston et al.
2012/0323502 A1 12/2012 Tanoura et al.
2013/0066166 A1 3/2013 Burnett et al.
2013/0109927 A1 5/2013 Menzel
2013/0109928 A1 5/2013 Menzel
2013/0131610 A1 5/2013 Dewaele et al.
2013/0218106 A1 8/2013 Coston et al.
2013/0245498 A1 9/2013 Delaney et al.
2013/0267871 A1 10/2013 Delaney et al.
2014/0039348 A1 2/2014 Bullington et al.
2014/0155781 A1 6/2014 Bullington et al.
2014/0155782 A1 6/2014 Bullington et al.
2014/0159921 A1 6/2014 Qualey et al.
2014/0187666 A1 7/2014 Aizenberg et al.
2014/0207085 A1 7/2014 Brandt et al.
2014/0243635 A1 8/2014 Arefieg
2014/0335490 A1 11/2014 Baarman et al.
2015/0120321 A1 4/2015 David et al.
2015/0233749 A1* 8/2015 Wang .................... G08B 25/10 340/613
2015/0342576 A1 12/2015 Hall et al.
2015/0343173 A1 12/2015 Tobescu et al.
2015/0359522 A1 12/2015 Recht et al.
2015/0362351 A1 12/2015 Joshi et al.
2016/0051176 A1 2/2016 Ramos et al.
2016/0183819 A1 6/2016 Burnett et al.
2017/0035342 A1 2/2017 Elia et al.
2017/0043089 A1 2/2017 Handler
2017/0100068 A1 4/2017 Kostov
2017/0113000 A1 4/2017 Tobescu et al.
2017/0136209 A1 5/2017 Burnett et al.
2017/0140103 A1 5/2017 Angelides
2017/0196478 A1 7/2017 Hunter
2017/0202698 A1 7/2017 Zani et al.
2017/0249445 A1 8/2017 Devries et al.
2017/0290540 A1 10/2017 Franco
2017/0291012 A1 10/2017 Iglesias
2017/0307423 A1 10/2017 Pahwa et al.
2017/0322197 A1 11/2017 Hall et al.
2018/0015251 A1 1/2018 Lampotang et al.
2018/0110456 A1 4/2018 Cooper et al.
2018/0160961 A1 6/2018 Gopinathan et al.
2018/0214122 A1 8/2018 Ansell et al.
2018/0214297 A1 8/2018 Hughett et al.
2018/0245967 A1* 8/2018 Parker .................... G01G 19/18
2018/0280236 A1 10/2018 Udin et al.
2018/0317891 A1 11/2018 Kim
2018/0344234 A1 12/2018 McKinney et al.
2019/0006047 A1 1/2019 Gorek et al.
2019/0017535 A1* 1/2019 Ormsbee .................. F16B 1/00
2019/0046102 A1 2/2019 Kushnir et al.
2019/0069829 A1 3/2019 Bulut
2019/0069830 A1 3/2019 Holt et al.
2019/0126006 A1 5/2019 Rehm et al.
2019/0150821 A1 5/2019 Waters et al.
2019/0167144 A1 6/2019 Jung et al.
2019/0201596 A1 7/2019 Luxon et al.
2019/0223844 A1 7/2019 Aboagye et al.
2019/0231244 A1 8/2019 Swan et al.
2019/0247236 A1 8/2019 Sides et al.
2019/0254582 A1 8/2019 Wei et al.
2019/0321588 A1 10/2019 Burnett et al.
2019/0328945 A1 10/2019 Analytis et al.
2019/0343445 A1 11/2019 Burnett et al.
2019/0358387 A1 11/2019 Elbadry et al.
2019/0365308 A1 12/2019 Laing et al.
2019/0381223 A1 12/2019 Culbert et al.
2020/0022637 A1 1/2020 Kurzrock et al.
2020/0064172 A1 2/2020 Tabaczewski et al.
2020/0085378 A1 3/2020 Burnett et al.
2020/0121300 A1 4/2020 Moore
2020/0187863 A1 6/2020 Tu et al.
2020/0268302 A1 8/2020 Oh
2020/0268303 A1 8/2020 Oliva
2020/0289749 A1 9/2020 Odashima et al.
2020/0405524 A1 12/2020 Gill
2021/0054610 A1 2/2021 Hall et al.
2021/0077007 A1 3/2021 Jouret et al.
2021/0100533 A1 4/2021 Seres et al.
2021/0299353 A1 9/2021 Mannu et al.
2022/0018692 A1 1/2022 Tourchak et al.
2022/0026001 A1 1/2022 Cheng et al.
2022/0026261 A1 1/2022 Funnell et al.
2022/0079487 A1* 3/2022 Horiguchi .............. A61B 5/742
2022/0192564 A1 6/2022 Kriscovich et al.
2022/0192565 A1 6/2022 Cheng et al.
2022/0192566 A1 6/2022 Cheng et al.
2022/0193375 A1 6/2022 Rehm et al.
2022/0233120 A1 7/2022 Beuret et al.
2022/0296140 A1 9/2022 Nguyen et al.
2022/0330867 A1 10/2022 Conley et al.
2022/0386917 A1 12/2022 Mann et al.
2023/0019703 A1 1/2023 Behzad et al.
2023/0022547 A1 1/2023 Cho et al.
2023/0025333 A1 1/2023 Patel et al.
2023/0028966 A1 1/2023 Franano
2023/0035669 A1 2/2023 Raja et al.
2023/0040915 A1 2/2023 Compton et al.
2023/0060232 A1 3/2023 Patel et al.
2023/0084476 A1 3/2023 Robichaud et al.
2023/0089041 A1 3/2023 Handler
2024/0042120 A1 2/2024 Cheng et al.
2024/0081708 A1 3/2024 Kelly et al.
2024/0108268 A1 4/2024 Woodard et al.
2024/0252783 A1 8/2024 Waitkus et al.
2024/0347162 A1 10/2024 Meese et al.
2024/0360938 A1 10/2024 Cheng et al.
2024/0424186 A1 12/2024 Justice et al.
2025/0090066 A1 3/2025 Tourchak
2025/0120636 A1 4/2025 Compton et al.
2025/0205456 A1 6/2025 Rehm et al.

FOREIGN PATENT DOCUMENTS

CN 200951235 Y 9/2007
CN 201492414 U 6/2010
CN 102647939 A 8/2012
CN 103054559 B 5/2015
CN 107952140 A 4/2018
CN 109498013 A 3/2019
CN 110859636 A 3/2020
CN 112426156 A 3/2021
EP 0342028 A2 11/1989
ES 2760470 T3 5/2020
GB 2437549 A 10/2007
GB 2576743 A 3/2020
JP S49-75171 A 7/1974
JP S54-147066 A 11/1979
JP S58-190719 A 11/1983
JP S60-219517 A 11/1985
JP H02-057240 B2 12/1990
JP H08-271301 A 10/1996
JP H10-104041 A 4/1998
JP 2007-303982 A 11/2007
JP 2008-524618 A 7/2008
JP 2009-068959 A 4/2009
JP 2010-121950 A 6/2010
JP 2010-530978 A 9/2010
JP 2012-105947 A 6/2012
JP 2012-225790 A 11/2012
JP 2018108356 A 7/2018
KR 20070115495 A 12/2007
NL 2013740 A 8/2016
RU 2615727 C2 4/2017
WO 1981003427 A1 12/1981
WO 2004045410 A1 6/2004
WO 2013013782 A2 1/2013
WO 20130178742 A1 12/2013
WO 2014/043650 A2 3/2014
WO 2014105755 A1 7/2014
WO 2014108690 A1 7/2014
WO 2014/135856 A1 9/2014
WO 2014/151068 A2 9/2014

(56) References Cited

FOREIGN PATENT DOCUMENTS

| | | | |
|---|---|---|---|
| WO | 2014145971 | A2 | 9/2014 |
| WO | 201511402 | A1 | 1/2015 |
| WO | 2015/105916 | A1 | 7/2015 |
| WO | 2015/127390 | A1 | 8/2015 |
| WO | 2015191125 | A1 | 12/2015 |
| WO | 2016177901 | A1 | 11/2016 |
| WO | 2017/023794 | A1 | 2/2017 |
| WO | 2018156624 | A1 | 8/2018 |
| WO | 2019066357 | A1 | 4/2019 |
| WO | 2019106675 | A1 | 6/2019 |
| WO | 2019/226697 | A1 | 11/2019 |
| WO | 2020033752 | A1 | 2/2020 |
| WO | 2020154370 | A1 | 7/2020 |
| WO | 2022108589 | A1 | 5/2022 |
| WO | 2022182794 | A1 | 9/2022 |
| WO | 2023022895 | A1 | 2/2023 |
| WO | 2023027871 | A1 | 3/2023 |
| WO | 2023076067 | A1 | 5/2023 |

OTHER PUBLICATIONS

DFree Pro Brochure 2019.
Leonhäuser, D et al., "Evaluation of electrical impedance tomography for determination of urinary bladder volume: comparison with standard ultrasound methods in healthy volunteers."—BioMed Engr On-line; 17:95; 2018.
Li, R., et al., "Design of a Noninvasive Bladder Urinary vol. Monitoring System Based on Bio-Impedance."—Engineering; vol. 5; pp. 321-325; 2013.
PCT/US20/61367 filed Nov. 19, 2020 International Search Report and Written Opinion dated Feb. 22, 2021.
PCT/US2022/017574 filed Feb. 23, 2022 Internation Search Report and Written Opinion dated Jun. 8, 2022.
Reichmuth, M., et al., "A Non-invasive Wearable Bioimpedance System to Wirelessly Monitor Bladder Filling."—Dep. of Health Sciences and Technology—Department of Information Technology and Electrical Engineering ETH Zurich, Zurich, Switzerland—Conference Paper; Mar. 2020.
Schlebusch, T. et al., "Bladder volume estimation from electrical impedance tomography" Physiological Measurement, Institute of Physics, Bristol, GB. vol. 35 No. 9 Aug. 20, 2014. (Aug. 20, 2014).
SECA product catalog, https://us.secashop.com/products/seca-mbca/seca-mbca-514/5141321139, last accessed Sep. 11, 2020.
U.S. Appl. No. 17/054,493, filed Nov. 10, 2020 Final Office Action dated Oct. 4, 2023.
U.S. Appl. No. 17/262,080, filed Jan. 21, 2021 Final Office Action dated Sep. 11, 2023.
U.S. Appl. No. 17/262,080, filed Jan. 21, 2021 Notice of Allowance dated Oct. 13, 2023.
U.S. Appl. No. 17/306,821, filed May 3, 2021 Advisory Action dated Oct. 3, 2023.
U.S. Appl. No. 17/306,821, filed May 3, 2021 Final Office Action dated Jul. 19, 2023.
U.S. Appl. No. 17/373,546, filed Jul. 12, 2021 Non-Final Office Action dated Nov. 1, 2023.
U.S. Appl. No. 17/556,907, filed Dec. 20, 2021 Non-Final Office Action dated Aug. 17, 2023.
U.S. Appl. No. 17/556,907, filed Dec. 20, 2021 Restriction Requirement dated May 12, 2023.
Bard Medical, Criticore Disposables—Non I.C., 3 pages, www.bardmedical.com/products/patienl-moniloring-,ystems/criticore®-system/criticore®-disposables-non-ic/ Jan. 30, 2015.
Bard Medical, Criticore Infection Control Disposables, 3 pages, www.bardmedical.com/patienl-moniloring-,ystems/criticore®-system/criticore®-infection-control-disposables/ Jan. 30, 2015.
Bard Medical, Criticore Monitor, 11 pages, www.bardmedical.com/products/patient-monitoring-systems/criticore®--monitor/ Jan. 30, 2015.
Bard Medical, Urine Meiers, 3 pages, www.bardmedical.com/products/urological-drainage/urine-collection/urinemeters/Jan. 30, 2015.
Biometrix, Urimetrix, 4 pages, www.biometrixmedical.com/Products/56/Urimetrix%E2%84%A2 Oct. 29, 2014.
Observe Medical, sippi, 3 pages, www.observemedical.com/products.html Oct. 29, 2014.
PCT/US19/33389 filed May 21, 2019 International Search Report and Written Opinion dated Aug. 2, 2019.
PCT/US2016/044835 filed Jul. 20, 2016 International Search Report and Written Opinion dated Dec. 16, 2016.
PCT/US2019/045787 filed Aug. 8, 2019 International Preliminary Report on Patentability dated Feb. 16, 2021.
PCT/US2019/045787 filed Aug. 8, 2019 International Search Report and Written Opinion dated Oct. 2, 2019.
U.S. Appl. No. 15/748,107, filed Jan. 26, 2018 Final Office Action dated Dec. 23, 2020.
U.S. Appl. No. 15/748,107, filed Jan. 26, 2018 Final Office Action dated Feb. 7, 2022.
U.S. Appl. No. 15/748,107, filed Jan. 26, 2018 Non-Final Office Action dated Sep. 3, 2021.
U.S. Appl. No. 15/748,107, filed Jan. 26, 2018 Non-Final Office Action dated Sep. 4, 2020.
U.S. Appl. No. 17/054,493, filed Nov. 10, 2020 Final Office Action dated May 31, 2022.
U.S. Appl. No. 17/054,493, filed Nov. 10, 2020 Non-Final Office Action dated Nov. 24, 2021.
U.S. Appl. No. 15/748,107, filed Jan. 26, 2018 Notice of Allowance dated Dec. 12, 2022.
U.S. Appl. No. 17/054,493, filed Nov. 10, 2020 Non-Final Office Action dated Jan. 27, 2023.
U.S. Appl. No. 17/262,080, filed Jan. 21, 2021 Non-Final Office Action dated Apr. 6, 2023.
U.S. Appl. No. 17/3026,821 filed May 3, 2021 Non-Final Office Action dated Jan. 10, 2023.
U.S. Appl. No. 17/373,535, filed Jul. 12, 2021 Non-Final Office Action dated November 9. 2022.
U.S. Appl. No. 17/373,535, filed Jul. 12, 2021 Notice of Allowance dated Feb. 23. 2023.
EP 20962628.2 filed May 31, 2023 Extended European Search Report dated Apr. 20, 2024.
EP 23188337.2 filed May 21, 2019 Extended European Search Report dated Dec. 4, 2023.
PCT/US2019/033389 filed Nov. 26, 2020 Extended European Search Report dated Jun. 4, 2021.
PCT/US2022/039191 filed Aug. 2, 2022 International Search Report and Written Opinion dated Dec. 5, 2022.
PCT/US2022/039746 filed Aug. 8, 2022 International Search Report and Written Opinion dated Nov. 18, 2022.
PCT/US2022/046920 filed Oct. 17, 2022 International Search Report and Written Opinion dated Feb. 20, 2023.
U.S. Appl. No. 17/054,493, filed Nov. 10, 2020 Notice of Allowance dated Jan. 4, 2024.
U.S. Appl. No. 17/306,821, filed May 3, 2021 Notice of Allowance dated Apr. 23, 2024.
U.S. Appl. No. 17/373,546, filed Jul. 12, 2021 Notice of Allowance dated Mar. 7, 2024.
U.S. Appl. No. 17/373,546, filed Jul. 12, 2021 Notice of Allowance dated May 29, 2024.
U.S. Appl. No. 17/556,907, filed Dec. 20, 2021 Notice of Allowance dated Dec. 6, 2023.
U.S. Appl. No. 17/556,931, filed Dec. 20, 2021 Non-Final Office Action dated Mar. 27, 2024.
U.S. Appl. No. 17/556,931, filed Dec. 20, 2021 Restriction Requirement dated Feb. 22, 2024.
"Urocare Reusable Night Drain Bottle—Urinary Collection System" Aug. 13, 2020, HealthProductsForYou.com, <https://www.healthproductsforyou.com/p-urocare-reusable-night-drain-bottle-urinary-collection-system.html> retrieved from Archive.org (Year: 2020).
U.S. Appl. No. 17/552,250, filed Dec. 15, 2021 Non-Final Office Action dated Sep. 19, 2024.
U.S. Appl. No. 17/556,931, filed Dec. 20, 2021 Final Office Action dated Oct. 1, 2024.
U.S. Appl. No. 17/552,250, filed Dec. 15, 2021 Final Office Action dated Feb. 11, 2025.

(56) References Cited

OTHER PUBLICATIONS

U.S. Appl. No. 17/556,931, filed Dec. 20, 2021 Notice of Allowance dated Mar. 18, 2025.
U.S. Appl. No. 17/587,938, filed Jan. 28, 2022 Restriction Requirement dated Jan. 22, 2025.
U.S. Appl. No. 17/682,785, filed Feb. 28, 2022 Restriction Requirement dated Apr. 2, 2025.
U.S. Appl. No. 17/863,223, filed Jul. 12, 2022 Non-Final Office Action dated Apr. 2, 2025.
U.S. Appl. No. 17/870,698, filed Jul. 21, 2022 Non-Final Office Action dated Apr. 9, 2025.
U.S. Appl. No. 17/870,698, filed Jul. 21, 2022 Restriction Requirement dated Feb. 12, 2025.
"Volumetric Flow Rate", www.vcalc.com/wiki/JeffNolumetric+%28Fluid%29+Flow+Rate, accessed Jan. 9, 2025, created Mar. 8, 2018 (Year: 2018).
U.S. Appl. No. 17/556,931, filed Dec. 20, 2021 Advisory Action dated Dec. 6, 2024.
U.S. Appl. No. 17/560,079, filed Dec. 22, 2021 Notice of Allowance dated Oct. 29. 2024.
U.S. Appl. No. 17/833,682, filed Jun. 6, 2022 Non-Final Office Action dated Jan. 15, 2025.
U.S. Appl. No. 17/879,658, filed Aug. 2, 2022 Non-Final Office Action dated Dec. 30, 2024.
U.S. Appl. No. 17/552,250, filed Dec. 15, 2021 Advisory Action dated May 8, 2025.
U.S. Appl. No. 17/552,250, filed Dec. 15, 2021 Notice of Allowance dated May 20, 2025.
U.S. Appl. No. 17/587,938, filed Jan. 28, 2022 Non-Final Office Action dated May 12, 2025.
U.S. Appl. No. 17/682,785, filed Feb. 28, 2022 Non-Final Office Action dated Jul. 16, 2025.
U.S. Appl. No. 17/833,682, filed Jun. 6, 2022 Final Office Action dated May 12, 2025.
U.S. Appl. No. 17/863,923, filed Jul. 13, 2022 Restriction Requirement dated May 21, 2025.
U.S. Appl. No. 17/873,834, filed Jul. 26, 2022 Non-Final Office Action dated May 19, 2025.
U.S. Appl. No. 17/879,658, filed Aug. 2, 2022 Final Office Action dated May 14, 2025.
U.S. Appl. No. 17/883,507, filed Aug. 8, 2022 Restriction Requirement dated May 19, 2025.
U.S. Appl. No. 17/941,941, filed Sep. 9, 2022 Restriction Requirement dated May 28, 2025.
U.S. Appl. No. 18/036,335, filed May 10, 2023 Non-Final Office Action dated Jun. 18, 2025.
U.S. Appl. No. 18/278,167, filed Aug. 21, 2023 Non-Final Office Action dated Apr. 24, 2025.
U.S. Appl. No. 18/682,075, filed Feb. 7, 2024 Non-Final Office Action dated Jun. 18, 2025.

* cited by examiner

AUTOMATED URINE OUTPUT SYSTEM FOR ATTACHMENT TO HOSPITAL BED

PRIORITY

This application claims the benefit of priority to U.S. Provisional Application No. 63/236,081, filed Aug. 23, 2021, which is incorporated by reference in its entirety into this application.

BACKGROUND

Today, nearly all physiological parameters of a patient admitted to a critical care unit are sensed automatically by commercial monitoring devices. This provides clinicians with invaluable information for interpreting the patient's state. In most cases, these devices can also supervise whether the values of the physiological parameters they sense remain within a pre-established range set by the clinician. This range represents the values considered as acceptable for each parameter. If a parameter does not fall within its acceptable range, audible warnings to alert the health care staff are generated. These devices discharge the healthcare staff of a considerable workload, since the staff need not continuously supervise whether the physiological parameters of every patient lie within the acceptable range. They also avoid human errors, which are common in any repetitive task such as the supervision of physiological parameters.

It has been stated that the most relevant physiological parameter which is still measured and supervised manually by healthcare staff is urine output. Urine output is the best indicator of the state of the patient's kidneys. If the kidneys are producing an adequate amount of urine, it means that they are well perfused and oxygenated. Otherwise, it is a sign that the patient is suffering from some complication. Urine output is required for calculating the patient's water balance, which is essential in the treatment of burn patients. Finally, it is also used in multiple therapy protocols to check whether the patient reacts properly to treatment. When urine output is too low the patient is said to have oliguria. If the patient does not produce urine at all, then he/she is said to have anuria. Sometimes, urine output can be too high; in these cases, the patient is said to have polyuria.

It is common to measure urine output by collecting urine in a graduated container. Periodically the nursing staff manually records the reading of the container of every patient, and operates a valve which releases the urine into a larger container. As such, the healthcare staff does not benefit from the advantages of having an automated determination and recording of urine output, or of the continuous and automatic supervision of its values. In critical care units, measurements of most every patient's urine output are often taken hourly, 24 times a day, 365 days a year. Furthermore, the monitoring of urine output for patients outside of the clinical setting is beneficial as well. As such urine collection devices that can be operated by the user/patient at home, for example, provide for urine output monitoring in the absence of a clinician. Transmitting the urine output data to the clinician provides for telemetric supervision of urine output information.

System and devices such as those described herein would decrease the workload associated with this collecting and monitoring urine output and, at the same time, permit supervision to take place on a more continuous basis resulting in better patient outcomes. Additionally, a compact system attached to the bed provides floor space for other medical equipment.

SUMMARY OF THE INVENTION

Briefly summarized, disclosed herein is a system for monitoring urine output (UO) of a patient. The system includes a UO module configured to couple with a collection container. The UO module includes (i) a frame configured for anchoring to a bed, (ii) a load cell coupled with the frame, the load cell configured to define an electrical signal in accordance with a force defined by a weight of UO within the collection container, and (iii) a console including logic stored in memory that, when executed by one or more processors, causes performance of system operations. The operations include (i) receiving the electrical signal from the load cell, (ii) converting the electrical signal into volumetric UO data, and (iii) transmitting the UO data across a network to an external entity. The collection container is configured to collect UO therein and, in use the UO flows through a drainage tube extending between the patient and collection container.

In some embodiments, the system includes the collection container and the collection container may include a bag. The system may further include an identification device in the form of a barcode, a matrix code, or a radio-frequency identification (RFID) tag that is configured to couple with the collection container, and the identification device includes patient identification information.

The frame includes a first frame member and a second frame member coupled with the first frame member. The first frame member includes one or more hooks configured to anchor the first frame member to one or more frame rails of the bed. The second frame member includes a weight measurement arm configured to couple with the collection container, and in use, the collection container is hung from the weight measurement arm.

The first frame member may include a drainage tube retention device coupled thereto, where the drainage tube retention device is configured to secure a portion of the drainage tube to the first frame member to isolate movement of a proximal portion of the drainage tube from movement of a distal portion of the drainage tube. In some embodiments, the drainage tube retention device is configured to apply a clamping force to the drainage tube.

In some embodiments, the first frame member includes a first horizontal shelf disposed at a bottom of the first frame member, and the second frame member includes a second horizontal shelf disposed above the first horizontal shelf. The load cell may be coupled between the first horizontal shelf and the second horizontal shelf.

The system may further include an intermediate coupling device configured to couple the collection container with the weight measurement arm, and the intermediate coupling device may be configured to selectively couple with and decouple from the weight measurement arm. The intermediate coupling device may be further configured to couple with the collection container and inhibit decoupling of the intermediate coupling device from the collection container.

The intermediate coupling device may include an S-hook having an upper hook opening configured to receive the weight measurement arm and a lower hook opening configured to receive a coupling loop of the collection container. The S-hook may further include a latching arm rotatably coupled with the S-hook, where the latching arm (i) extends across the lower hook opening to define a closed position, (ii) is rotatable away from the closed position toward the lower hook opening to provide access to the lower hook opening, and (iii) is biased toward the closed position. In use, the coupling loop of the collection container may exert a force on the latching arm to rotate the latching arm away from the closed position allowing the lower hook opening to receive the coupling loop, and the latching arm may self-rotate back to the closed position inhibiting removal of the coupling loop from the lower hook opening. In use, the identification device may be attached to the S-hook.

In some embodiments, the operations may further include comparing the UO data with a UO limit stored in memory and as a result of the comparison, transmitting an alert to the external entity when the UO data exceeds the UO limit. The operations may further include obtaining identification information from the identification device and linking the UO data with the identification information.

Also disclosed herein is a method of monitoring urine output (UO) of a patient. The method includes coupling a UO collection container with a urinary catheter of the patient via a drainage tube extending between the catheter and the collection container and coupling the collection container with a UO monitoring system that includes a load cell configured to measure a weight of UO within the collection container. The method further includes (i) anchoring the UO monitoring system to a patient bed, (ii) establishing a flow of urine from the patient to the collection container, (iii) measuring a weight of UO within the collection container, (iv) converting weight of the UO into volumetric UO data, and (v) transmitting the UO data across a network to an external entity, where the external entity may include an electronic medical record.

The method may further include coupling an identification device with the collection container, where the identification device includes patient identification information, and the identification device is one of a barcode, a matrix code, or an RFID tag.

In some embodiments of the method, anchoring the UO monitoring system to a patient bed includes coupling one or more hooks of a first frame member of the UO monitoring system with one or more frame rails of the patient bed. A second frame member of the UO monitoring system may include a weight measurement arm, and the method may further include hanging the collection container from the weight measurement arm.

In some embodiments of the method, the first frame member further includes a drainage tube retention device configured to isolate movement of a distal portion of the tube from movement of a proximal portion of the tube, and the method further includes securing the drainage tube to the first frame member via the drainage tube retention device.

The method may further include coupling an intermediate coupling device of the UO monitoring system between the collection container and the weight measurement arm, where the intermediate coupling device is configured to couple with the collection container, and inhibit decoupling from the collection container. In some embodiments of the method, coupling an identification device with the collection container includes attaching the identification device to the intermediate coupling device.

The method may further include comparing the UO data with a UO limit stored in memory of the UO monitoring system, and as a result of the comparison, transmitting an alert to the external entity when the UO data exceeds the UO limit. The method may also further include obtaining identification information from the identification device, and linking the UO data with the identification information.

These and other features of the concepts provided herein will become more apparent to those of skill in the art in view of the accompanying drawings and the following description, which describe particular embodiments of such concepts in greater detail.

BRIEF DESCRIPTION OF DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION

Figure 1:
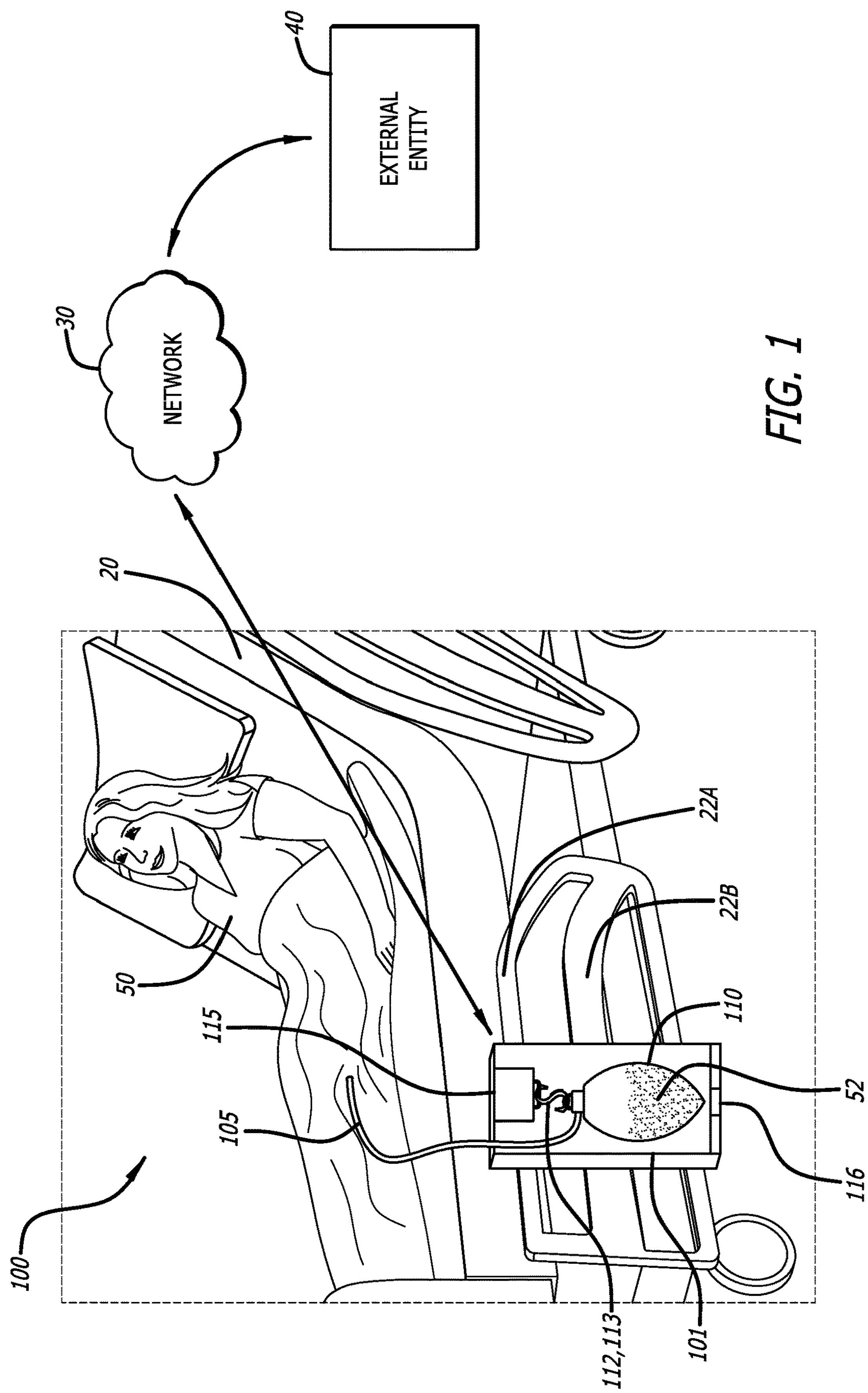
FIG. 1 illustrates an embodiment of a urine output monitoring system in use within a hospital environment, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise. The words "including," "has," and "having," as used herein, including the claims, shall have the same meaning as the word "comprising." Furthermore, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, components, functions, steps or acts are in some way inherently mutually exclusive.

The phrases "connected to" and "coupled to" refer to any form of interaction between two or more entities, including mechanical, electrical, magnetic, electromagnetic, fluid, signal, communicative (including wireless), and thermal interaction. Two components may be connected or coupled to each other even though they are not in direct contact with each other. For example, two components may be coupled to each other through an intermediate component.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

The directional terms "proximal" and "distal" are used herein to refer to opposite locations on a medical device. The proximal end of the device is defined as the end of the device closest to the end-user when the device is in use by the end-user. The distal end is the end opposite the proximal end, along the longitudinal direction of the device, or the end furthest from the end-user.

Unless defined otherwise, all technical and scientific terms used herein have the same meaning as commonly understood by those of ordinary skill in the art.

FIG. 1 illustrates an embodiment of a urine output (UO) monitoring system, in accordance with some embodiments disclosed herein. The UO monitoring system 100 is generally configured to automatically collect and monitor UO from a patient 50. The UO monitoring system 100 is further configured to automatically record UO data and share the UO data across a network 30 with an external entity 40. The UO monitoring system 100 generally includes a UO module 101 coupleable with a UO collection container 110 to measure a weight of the collection container 110 having urine 52 collected therein. In the illustrated embodiment, the UO monitoring system 100 includes an intermediate coupling device 112 coupled between the collection container 110 and the UO module 101 and the intermediate coupling device 112 may include an identification device 113 attached thereto.

The UO module 101 is selectively attachable to a bed 20, such as via bed frame rails 22A, 22B, for example. Attaching the UO module 101 to the bed 20 provides for co-location of the UO monitoring system 100 with the bed 20 which may be beneficial when the patient 50 along with the bed 20 is moved, such as between rooms, for example.

In use, the collection container 110 is fluidly coupled with a bladder of the patient 50 via a drainage tube 105 so that urine 52 flows through the drainage tube 105 to the collection container 110. The UO module 101 includes a console 115 coupled with a load cell (i.e., a force sensor) 116. The console 115 and the load cell 116 provide for automatically measuring and recording of a volume of urine 52 within the collection container 110 as further described below.

In use, the clinician may catheterize the patient 50 and connect a urinary catheter (not shown) to the drainage tube 105. The clinician may couple the collection container 110 with the UO module 101. The UO module 101 may automatically measure and record the volume of urine 52 within the collection container 110 to define UO data for the patient 50. The UO module 101 may transmit the UO data to the external entity 40 across the network 30 so that the clinician may view the UO data on a display of the external entity 40.

The network 30 represents the communication pathways between the UO module 101 and the external entity 40. In one embodiment, the network 30 is the Internet. The network 30 can also utilize dedicated or private communication links (e.g., WAN, MAN, or LAN) that are not necessarily part of the Internet. The network 30 may use standard communications technologies and/or protocols.

The external entity 40 may be a person, an institution, or a cloud computing environment (e.g., cloud computing resources accessible via a network such as the internet). In some embodiments, the external entity 40 may include a healthcare provider. As such, it may be possible for the clinician or other healthcare professional to access UO information of the UO monitoring system 100 and thereby remotely monitor the UO condition of the patient 50. In some embodiments, the UO monitoring system 100 may be configured to alert the external entity 40 of an extreme UO condition or trend.

In some embodiments, the external entity 40 may include access to an electronic medical record (EMR) of the patient 50. In such embodiments, the EMR may automatically record UO information for review by the healthcare provider. In further embodiments, the external entity 40 may include a user interface (not shown) to provide for manual entry of information such as an identification of the patient 50, for example.

Those of skill in the art will appreciate that the UO monitoring system 100 may contain other architectural modules that are not described herein. In addition, conventional elements, such as firewalls, authentication systems, payment processing systems, network management tools, load balancers, and so forth are not shown as they are not material to the invention.

Figure 2:
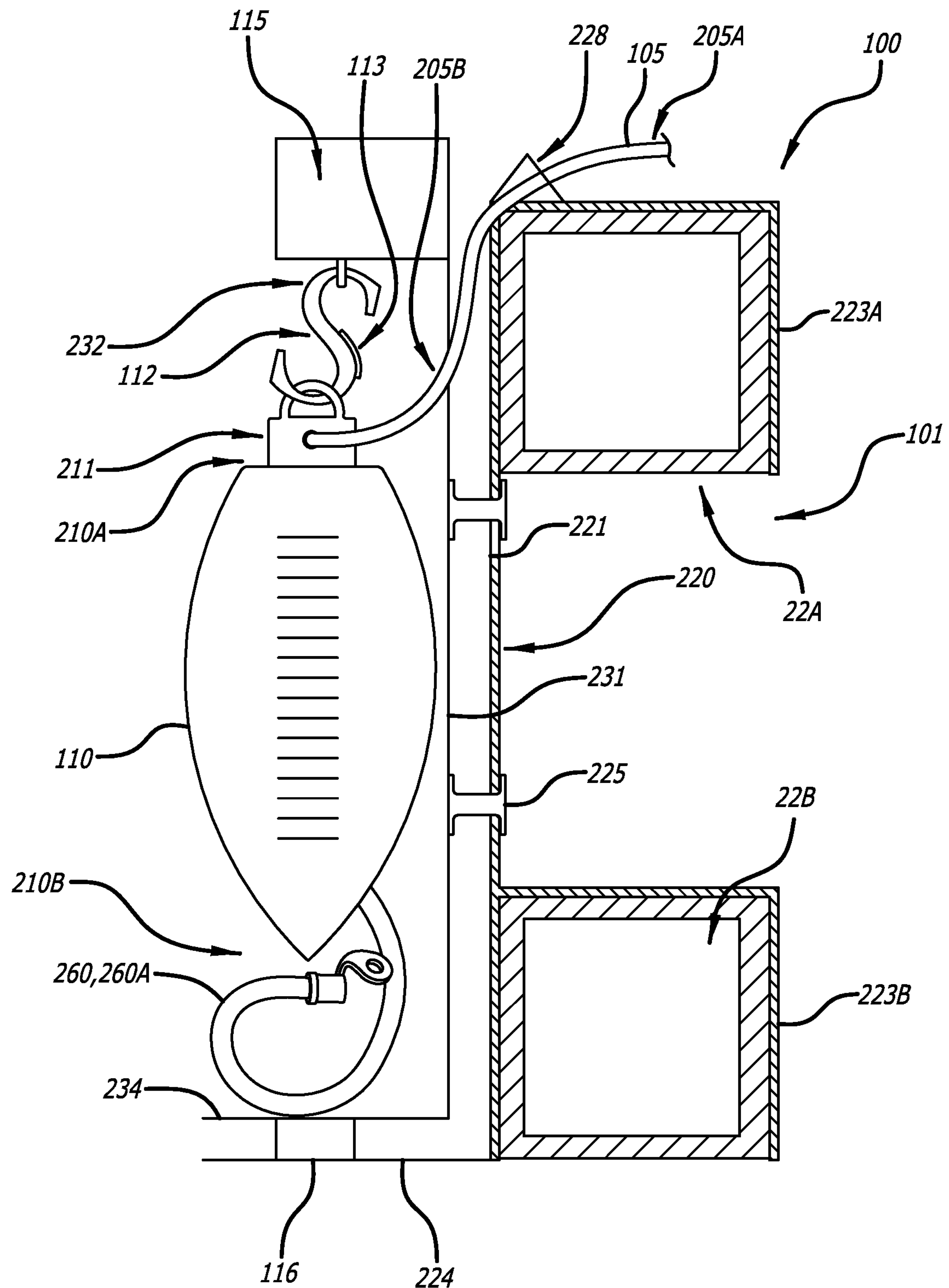
FIG. 2 illustrates a side view of the system of FIG. 1, in accordance with some embodiments.

FIG. 2 is a side view illustration of the UO monitoring system 100, according to some embodiments. In some embodiments, the collection container 110 may be a separate component for use with the UO monitoring system 100. In other embodiments, the UO monitoring system 100 may include the collection container 110. The collection container 110 may be a flexible bag. As shown, the drainage tube 105 is coupled with the collection container 110 at a top end 210A of the collection container 110. An outlet port 260 is coupled with the collection container 110 at a bottom end 210B of the collection container 110. In some embodiments, the outlet port 260 may include a tube 206A 260A extending away from the collection container 110. The collection container 110 includes an attachment component 211 at the top end 210A, and the attachment component 211 may include a loop portion of the collection container 110.

The collection container 110 may define a volume capacity to allow urine 52 to be collected and measured over an extend period of time (e.g., about 1-2 days) without draining the urine 52 from the collection container 110. In some embodiments, the collection container 110 may define a volume capacity exceeding about 1 liter, 2 liters, 3 liters or more.

With further reference to FIG. 2, the UO module 101 includes a frame 220 having a first frame member 221 coupleable with the frame rails 22A, 22B and a second frame member 231 coupleable with the collection container 110. The first frame member 221 includes frame hooks 223A, 223B configured to anchor the first frame member 221 to the frame rails 22A, 22B, respectively. In some embodiments, the first frame member 221 may include only one frame hook, such as the frame hook 223A, for example.

Those of skill in the art will appreciate that the UO module 101 may be coupled with any structural members of the bed via clamps, adhesives, threaded fasteners, magnetic components, or any other suitable anchoring mechanism.

The first frame member 221 is coupled with the second frame member 231 via one or more resilient coupling components 225. The resilient coupling components 225 may constrain horizontal displacement of the second frame member 231 with respect to the first frame member 221 while allowing for vertical displacement of the second frame member 231 with respect to the first frame member 221.

The second frame member 231 includes a weight measurement arm 232 extending above the collection container 110. The weight measurement arm 232 is configured to couple with and suspend the collection container 110, i.e., in use, the collection container 110 hangs from the weight measurement arm 232.

In some embodiments, the second frame member 231 may include a bottom shelf 234 disposed horizontally beneath the collection container 110. In use, the outlet port 260 and/or a bottom portion of the collection container 110 may contact the bottom shelf 234 such that a portion of the weight of the collection container 110 may be supported by the bottom shelf 234. In some embodiments, the first frame member 221 may also include a bottom shelf 224 disposed beneath the bottom shelf 234 of the second frame member 231.

The load cell 116 is coupled between the first frame member 221 and the second frame member 231 so as to measure a vertically oriented force between the first frame member 221 and the second frame member 231. As the collection container 110 is coupled with the second frame member 231, the vertically oriented force between the second frame member 231 and the first frame member 221 is related to the weight of the collection container 110 including the urine 52 disposed therein. In the illustrated embodiment, the load cell 116 is coupled between the bottom shelf 224 of the first frame member 221 and the bottom shelf 234 of the second frame member 231. In other embodiments, the load cell 116 may be coupled between the first frame member 221 and the second frame member 231 at a location other than between the bottom shelf 224 of the first frame member 221 and the bottom shelf 234 of the second frame member 231.

The first frame member 221 includes a tubing retention device 228 attached thereto. The tubing retention device 228 is configured to secure the drainage tube 105 to the first frame member 221 so that movement of a distal portion 205A of the drainage tube 105 is isolated from movement of a proximal portion 205B of the drainage tube 105. In use, the patient 50 is coupled with the distal portion 205A of the drainage tube 105. As such, in some instances, movement of the patient 50 may result in movement of the distal portion 205A. Similarly, the proximal portion 205B of the drainage tube 105 is coupled with the collection container 110, and movement of the proximal portion 205B may affect the weight measurement of the collection container 110. The tubing retention device 228 is configured to prevent movement of the distal portion 205A from causing the proximal portion 205B to move. In some embodiments, the tubing retention device 228 may include two or more tubing engagement members (not shown) configured to contact the drainage tube 105 on opposites sides of the drainage tube 105. The tubing engagement members may define a clamping force on the circumference of the drainage tube 105 sufficient to prevent rotation and/or longitudinal displacement of the drainage tube 105 with respect to the tubing retention device 228.

The intermediate coupling device 112 (i.e., the S-hook) couples the weight measurement arm 232 of the UO module 101 with the attachment component 211 of the collection container 110. More specifically, in use, the intermediate coupling device 112 hangs on the weight measurement arm 232 and the collection container 110 hangs on the intermediate coupling device 112.

Figure 3:
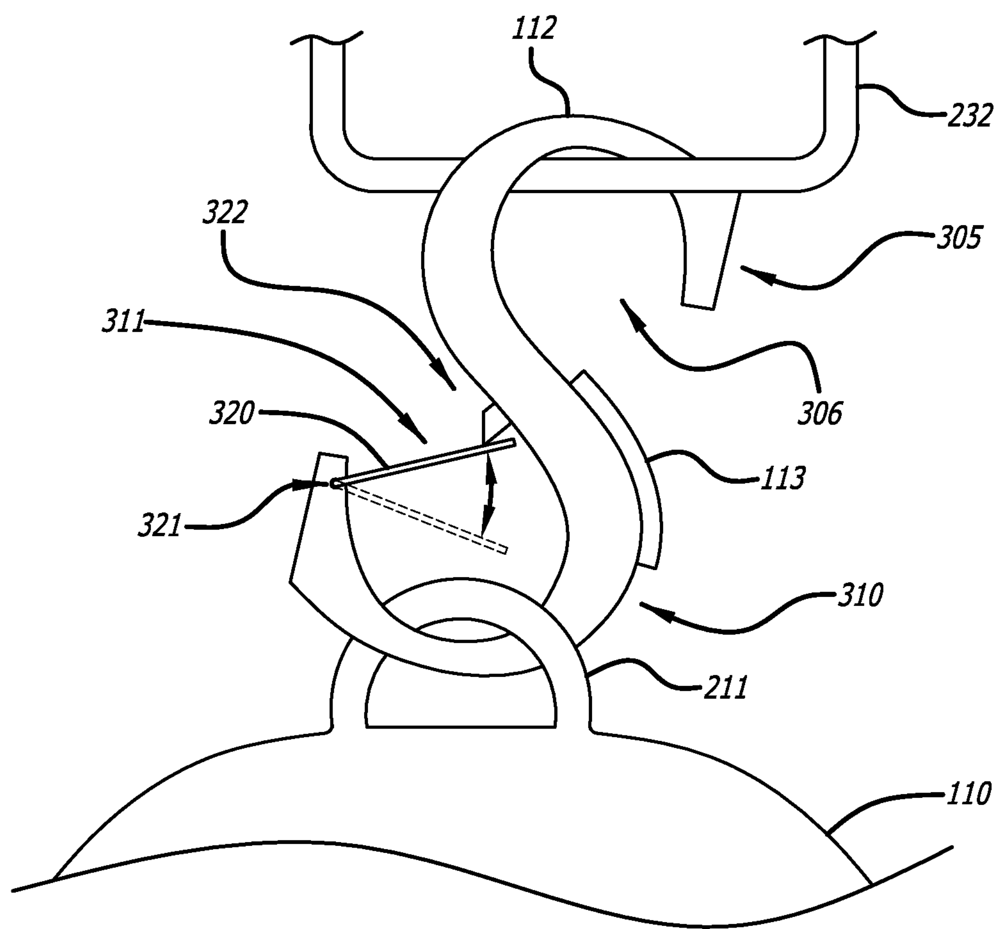
FIG. 3 is an illustration of an intermediate coupling device of the system of FIG. 1, in accordance with some embodiments.

FIG. 3 is a detailed illustration of the intermediate coupling device 112, in accordance with some embodiments. The intermediate coupling device 112 generally includes (i) an upper coupling portion 305 for selective coupling with the weight measurement arm 232 and (ii) a lower coupling portion 310 for coupling with the attachment component 211 of the collection container 110.

The upper coupling portion 305 includes an upper opening 306 configured to receive the weight measurement arm 232 therein. The upper coupling portion 305 is configured to extend over the weight measurement arm 232 so that the weight of the collection container 110 is supported by the weight measurement arm 232. In some instances, the patient 50 may need to move away from the bed 20 (FIG. 1), and in such instances, the collection container 110 may need to be separated from the UO module 101. As such, the upper coupling portion 305 is configured for selective coupling to and decoupling from the weight measurement arm 232.

The lower coupling portion 310 is configured to couple with the collection container 110. However, in contrast to the upper coupling portion 305, the lower coupling portion 310 is configured to inhibit decoupling of the intermediate coupling device 112 from the collection container 110. More specifically, the lower coupling portion 310 is configured for extension through the loop of attachment component 211, and for retention within the loop of the attachment component 211.

In an exemplary embodiment, the intermediate coupling device 112 includes a latching arm 320 extending across an opening 311 of the lower coupling portion 310 to form a one-way hinge. The latching arm 320 is rotatable (clockwise as illustrated) about a pivot point 321 inward of the opening 311 to allow the lower coupling portion 310 to be inserted through the attachment component 211. The latching arm 320 is biased in the counterclockwise direction toward a mechanical stop 322 to define a closed position. The mechanical stop 322 prevents counterclockwise rotation of the latching arm 320 away from the closed position to inhibit extraction of the lower coupling portion 310 from the attachment component 211. As such, in use, the intermediate coupling device 112 may attach to the collection container 110 and may inhibit/prevent detachment from the collection container 110. As may be appreciated by one of ordinary skill, other suitable mechanisms could be employed to (i) allow connection of the intermediate coupling device 112 to the collection container 110 and (ii) prevent disconnection of the intermediate coupling device 112 from the collection container 110, and such other suitable mechanisms are therefore disclosed herein.

As stated above, the UO monitoring system 100 further includes an identification device 113 coupled with the intermediate coupling device 112. The identification device 113 may be a barcode, a matrix code (e.g., a quick response (QR) code) or a radio-frequency identification (RFID) tag. The identification device 113 may include patient specific information. In use, the identification device 113 may be attached to the intermediate coupling device 112 by the clinician. In some embodiments, the identification device 113 may include human readable information. Attaching of the intermediate coupling device 112 together with the identification device 113 to the collection container 110, links the collection container 110, the urine 52 collected within the collection container 110, and the UO data to the patient 50.

Figure 4:
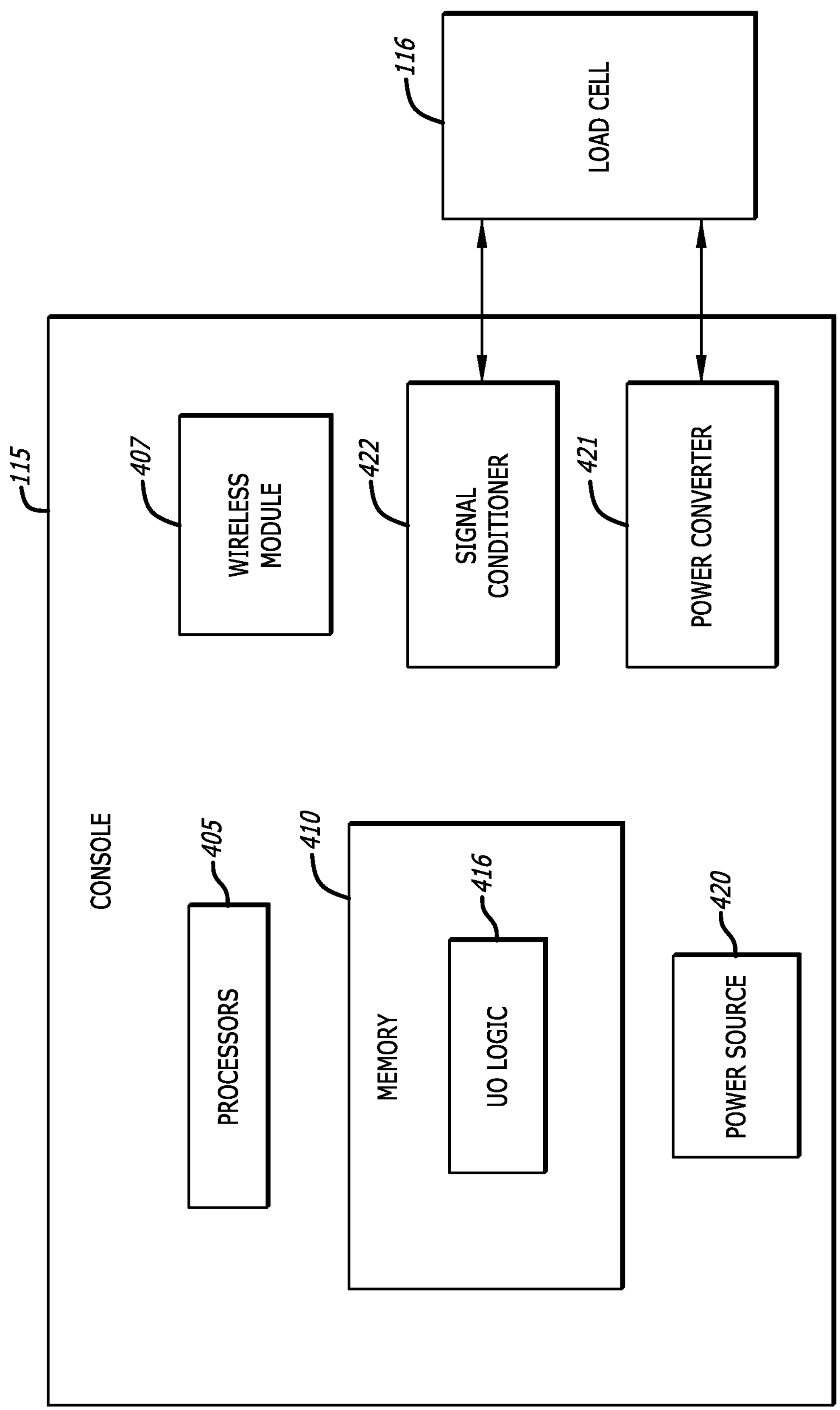
FIG. 4 is a block diagram of a console of the system of FIG. 1, in accordance with some embodiments.

FIG. 4 illustrates a block diagram of the console 115 of FIG. 1, in accordance with some embodiments. The console 115 includes one or more processors 405 and memory 410 including a non-transitory, computer-readable storage medium. Stored in the memory 410 is UO logic 416. A power source 420 provides electrical power to the console 115 including the console components and the load cell 116. The load cell 116 is coupled with the console 115. A signal conditioner 422 converts electrical signals from the load cell 116 to digital signals for processing by the UO logic 416. The electrical power passes through a power converter 421 to facilitate the operation of the load cell 116. A wireless module 407 facilitates communication and data sharing with the external entity 40.

The power source 420 may be an external facility power source. The power source 420 may also include a rechargeable battery configured to provide power when the UO module 101 is disconnected from the power source 420. The power converter 421 converts the electrical power from the power source 420 into forms of electrical power compatible with the load cell 16 and the console components.

The UO logic 416 is configured to control the load cell 116 and process electrical signals received from the load cell 116. The UO logic 416 may also control the power converter 421 to enable/disable the load cell 116. The UO logic 416 receives digital signals from the load cell 116 via the signal conditioner 422 and processes the digital signals into UO data. More specifically, the UO logic 416 converts the digital signals from the load cell 116 into a weight of the urine 52 within the collection container 110 and then further converts the weight of the urine 52 into a volume of the urine 52. The UO logic 416 records and prepares the UO data for transfer to the external entity 40.

The UO logic 416 may receive identification information (e.g., the identification of the patient 50 included on the identification device 113) and link the UO data to the identification of the patient 50. In some embodiments, the UO logic 416 may receive the identification information via the wireless module 407, and in further embodiments, the wireless module 407 may be configured to receive the identification information from an RFID tag.

In some embodiments, the UO logic 416 may be configured to generate an alert (e.g., a warning) in the event of an extreme UO condition or trend. More specifically, the UO logic 416 may compare the UO data with one or more limits stored in memory 410. As a result of the comparison, the UO logic 416 may transmit the alert to the external entity 40. In one exemplary embodiment, the UO logic 416 may compare the UO data with a low UO limit and generate an alert when the UO data indicates a UO below the low UO limit.

In the illustrated embodiment, the UO logic 416 may be in the form of a software application that is loaded on the UO module 101 and executable by the one or more processors 405. In other embodiments, the UO logic 416 or portions thereof, need not be loaded on the UO module 101 but may instead execute within a cloud computing environment (which may also be represented by the reference numeral 30) such that UO data obtained by the UO module 101 are communicated to the UO logic 416 for processing. Thus, the UO logic 416 represented as being part of the UO module 101 may include an application programming interface (API) that is configured to transmit and receive data communication messages to and from the UO logic 416 operating in the cloud computing environment.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

What is claimed is:

1. A system for monitoring urine output (UO) of a patient, comprising:
- a UO module configured for coupling with a collection container, the UO module comprising:
  - a frame configured for anchoring to a bed, wherein the frame includes:
    - a first frame member; and
    - a second frame member coupled with the first frame member;
  - a load cell coupled with the frame, the load cell configured to define an electrical signal in accordance with a force defined by a weight of the UO within the collection container,
    - wherein:
      - the collection container is configured to collect UO therewithin,
      - in use, the UO flows through a drainage tube extending between the patient and the collection container, and
    - the load cell is operatively coupled between the first frame member and
    - the second frame member; and
  - a console including logic stored in memory that, when executed by one or more processors, causes performance of operations that include:
    - receiving the electrical signal from the load cell,
    - converting the electrical signal into volumetric UO data, and
    - transmitting the volumetric UO data across a network to an external entity.

2. The system of claim 1, further comprising the collection container.

3. The system of claim 2, further including an identification device coupled with the collection container, the identification device including patient identification information, wherein the identification device is one of a barcode, a matrix code, or a radio-frequency identification (RFID) tag.

4. The system of claim 3, wherein
- the first frame member comprises one or more hooks configured to anchor the first frame member to one or more frame rails of the bed.

5. The system of claim 4, wherein:

the second frame member includes a weight measurement arm configured to couple with the collection container, and in use, the collection container hangs from the weight measurement arm.

6. The system of claim 4, wherein:

the first frame member includes a drainage tube retention device coupled thereto, and the drainage tube retention device is configured to secure a portion of the drainage tube to the first frame member to isolate movement of a proximal portion of the drainage tube from movement of a distal portion of the drainage tube.

7. The system of claim 4, wherein:

the first frame member comprises a first horizontal shelf disposed at a bottom of the first frame member, the second frame member comprises a second horizontal shelf disposed above the first horizontal shelf, and the load cell is coupled between the first horizontal shelf and the second horizontal shelf.

8. The system of claim 5, further comprising an intermediate coupling device configured to couple the collection container with the weight measurement arm, the intermediate coupling device configured to selectively couple with the weight measurement arm and decouple from the weight measurement arm.

9. The system of claim 8, wherein the intermediate coupling device is configured to:

couple with the collection container, and inhibit decoupling from the collection container.

10. The system of claim 8, wherein the intermediate coupling device includes an S-hook comprising:

an upper hook opening configured to receive the weight measurement arm, and a lower hook opening configured to receive a coupling loop of the collection container.

11. The system of claim 10, wherein the S-hook further comprises a rotatable latching arm, and wherein the rotatable latching arm:

extends across the lower hook opening to define a closed position, is rotatable away from the closed position toward the lower hook opening to provide access to the lower hook opening, and is biased toward the closed position.

12. The system of claim 11, wherein in use:

the coupling loop of the collection container exerts a force on the rotatable latching arm to rotate the rotatable latching arm away from the closed position allowing the lower hook opening to receive the coupling loop, and the rotatable latching arm self-rotates back to the closed position, inhibiting removal of the coupling loop from the lower hook opening.

13. The system of claim 10, wherein, in use, the identification device is attached to the S-hook.

14. The system of claim 13, wherein the operations further include:

obtaining the patient identification information from the identification device, and linking the volumetric UO data with the patient identification information.

15. A method of monitoring urine output (UO) of a patient, comprising:

coupling a UO collection container with a urinary catheter of the patient, via a drainage tube extending between the urinary catheter and the UO collection container;

coupling the UO collection container with a UO monitoring system, the UO monitoring system comprising a load cell configured to measure a weight of the UO within the UO collection container;

anchoring the UO monitoring system to a patient bed;

establishing a flow of urine from the patient to the UO collection container;

measuring the weight of the UO within the UO collection container;

converting the weight of the UO into volumetric UO data; and transmitting the volumetric UO data across a network to an external entity, wherein:

the UO monitoring system includes a first frame member and a second frame member, the load cell is operatively coupled between the first frame member and the second frame member, and the load cell is configured to measure a force between the first frame member and the second frame member.

16. The method of claim 15, further comprising coupling an identification device with the UO collection container, wherein the identification device includes patient identification information.

17. The method of claim 16, wherein anchoring the UO monitoring system to the patient bed comprises coupling one or more hooks of the first frame member of the UO monitoring system with one or more frame rails of the patient bed.

18. The method of claim 16, wherein the second frame member of the UO monitoring system includes a weight measurement arm, the method further comprising hanging the UO collection container from the weight measurement arm.

19. The method of claim 16, The method of claim 1, wherein the first frame member further includes a drainage tube retention device configured to isolate movement of a distal portion of the drainage tube from movement of a proximal portion of the drainage tube, the method further comprising securing the drainage tube to the first frame member via the drainage tube retention device.

20. The method of claim 18, further comprising coupling an intermediate coupling device of the UO monitoring system between the UO collection container and the weight measurement arm, the intermediate coupling device configured to inhibit decoupling of the intermediate coupling device from the UO collection container.

21. The method of claim 20, wherein coupling the identification device with the UO collection container comprises attaching the identification device to the intermediate coupling device.

22. The method of claim 21, further comprising:

obtaining the patient identification information from the identification device, and linking the volumetric UO data with the patient identification information.

23. The system of claim 1, wherein:

the first frame member is attached to the second frame member via one or more resilient coupling components, and the one or more resilient coupling components:
constrain horizontal displacement of the second frame member with respect to the first frame member, and
allow vertical displacement of the second frame member with respect to the first frame member.

* * * * *